United States Patent
Dove et al.

(10) Patent No.: US 6,175,865 B1
(45) Date of Patent: Jan. 16, 2001

(54) APPARATUS FOR AUTOMATICALLY CONFIGURING NETWORK MEDIA CONNECTIONS

(75) Inventors: Daniel J. Dove, Applegate; Bruce W. Melvin, Roseville, both of CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/190,695

(22) Filed: Nov. 12, 1998

(51) Int. Cl.$^7$ ................................................ G06F 13/00
(52) U.S. Cl. ................................................ 709/220
(58) Field of Search ........................... 370/254, 445; 709/200, 220, 221, 222, 227, 238

(56) References Cited

U.S. PATENT DOCUMENTS 5,410,535 * 4/1995 Yang et al. .............................. 713/1

* cited by examiner

Primary Examiner—Robert B. Harrell (57) ABSTRACT

Apparatus is disclosed for automatically configuring network media connections of end node interfaces as well as node interfaces that operate as a hub, a switch or a repeater in a Local Area Network. The apparatus utilizes a pseudo-random sequencer to prevent lock step operation whereby the connections cannot be properly configured.

17 Claims, 5 Drawing Sheets

| CONTACT | PHY | MDI | MDI-X |
|---|---|---|---|
| 1 | B1_DA+ | B1_DA+  22 | B1_DB+  24 |
| 2 | B1_DA− | B1_DA−  22 | B1_DB−  24 |
| 3 | B1_DB+ | B1_DB+  24 | B1_DA+  22 |
| 4 | B1_DC+ | B1_DC+ | B1_DD+ |
| 5 | B1_DC− | B1_DC− | B1_DD− |
| 6 | B1_DB− | B1_DB−  24 | B1_DA−  22 |
| 7 | B1_DD+ | B1_DD+ | B1_DC+ |
| 8 | B1_DD− | B1_DD− | B1_DC− |

APPARATUS FOR AUTOMATICALLY CONFIGURING NETWORK MEDIA CONNECTIONS

BACKGROUND OF THE INVENTION

1. Field of the Invention

The present invention generally relates to computer local area networks, and more particularly to node devices having Media Dependent Interfaces (MDI) that are installed in such networks and their automatic connection configuration

2. Description of the Related Art

Many local area network products (LAN) use a medium consisting of twisted copper wire pairs for the transmission and reception of data. It is generally a requirement that one or more pairs be used for transmission of data in one direction and one or more other pairs to receive data in the opposite direction. The connection between two node devices is a link. For LAN technologies which employ a full-duplex medium, many have different pairs for transmission than for reception and thereby require that each end of the link use a defined assignment for its twisted pair connector to a particular pair of wires. For example, a Network Interface Card (NIC) is usually employed as an end node device, while a switch or a repeater will be employed as a concentrator or central component in a star-based network. For the link to operate, the NIC must transmit on a pair of wires that is connected to the receiver of the hub or switch and the NIC's receiver must be connected to the transmitter at the other end of the link. If the transmit pair of wires of a device are connected to the transmit connectors of the connected device, the communication link will obviously fail.

Most LAN standards address this by assigning different connector pins to the wires in the twisted pair which is typically referred to as the Media Dependent Interface (MDI). In the IEEE-802.3's 10BASE-T standard, an end node will assign pins 1 and 2 to the transmit pair while pins 3 and 6 are for connection to a twisted pair for receiving. The hub, which is typically a repeater or a switch for a 10BASE-T network, will assign its transmitter to pins 3 and 6 while its receiver will be connected to pins 1 and 2. This works quite well for configurations where NIC's are attached to repeaters, but there are a few cases that become more important to consider with the emergence of switched networks. First there is a case where the NIC is connected directly to another NIC, or a repeater is connected to a repeater or a repeater is connected to a switch. Depending upon the assignment of pins at the network interface, it may become necessary to employ a crossover cable to address the fact that both products employ the same pin designations on their interfaces.

Some products will use a manual "MDIX" switch, with MDIX being a hub, repeater or switch configuration as opposed to an end node device, which is known as a MDI configured device. The switch allows the products to connect to other similar devices but requires an installer to manually push a button. The approach worked well for limited applications like a repeater-to-repeater port, but not in the general case where it is desired to build a product that attaches to either a repeater, NIC or switch without manual intervention.

This resulted in the development of bus switches for making a solid state version of a crossover type circuit that used a low frequency alternating pin selection to perform an automatic operation. However, the product had the drawback that if two such devices were attached together, they could potentially get into a "lock step" operation where the necessary connections for establishing a communication link became impossible. Subsequently other products were developed which employed a similar algorithm and were forced to use a different alternation rate to avoid the lock step phenomena. While that worked for a limited set of products, it did not solve the general case whereby a guaranteed connection between nodes was achieved regardless of the manufacture or the model of product that was being used.

SUMMARY OF THE INVENTION

Accordingly, it is a primary object of the present invention to effectively solve the problem of lock step interaction in an improved automatic media connection apparatus which can effectively be used with products of well known manufacturers.

It is another object of the present invention to provide such an improved apparatus by using a pseudo-random generating element, in addition to an actual random elements to provide an implementation of an auto-MDIX/MDI algorithm that is virtually impossible to be placed in a lock step condition.

Yet another object of the present invention is to provide such an improved apparatus that is inexpensive to implement. The low cost is achieved by utilizing logic elements that exist in many node devices, so that software, or very minor hardware implementations comprise the essential cost that is involved.

Still another object of the present invention is to provide such an improved apparatus which is robust in its functionality and requires no user or customer intervention and which is operable whenever a device embodying the present invention is added to a network. Once the physical connections are made and the apparatus powered up, proper configuration is virtually assured.

These and other objects will become apparent upon reading the following detailed description, while referring to the attached drawings, in which:

DETAILED DESCRIPTION

The present invention generally relates to an apparatus for automatically configuring media connections in a local area network. While the apparatus embodying the present invention is particularly directed to apparatus for automatically configuring connectors which use twisted copper wire pairs for transmission of data in a first direction in a network, and other twisted copper wire pairs for transmission of data in the opposite direction, the present invention has application for other media. It is particularly suited for local area networks (LAN's) which operate on a 10BASE-T standard, a 100BASE-T standard as well as for 1000BASE-T, and also works for FDDI-TPPMD, Token Ring, and others.

The apparatus automatically determines and sets the configuration of end node media dependent interfaces (MDI) or interfaces for repeaters, switches and hubs which have a MDIX configuration. The apparatus provides very rapid resolution of divisional nodes for configuring the node properly in one of the MDI or MDIX configurations so that bidirectional communication is enabled. The apparatus is extremely robust in that it is virtually impossible for the automatic and accurate configuration not to be set and that a lock-up condition occur. The apparatus is easily implemented, is interoperable with existing products at an extremely low cost and may be implemented with CMOS switches, or parallel transmitter and receiver blocks for 10BASE-T and 100BASE-T LANs.

Figure 1:
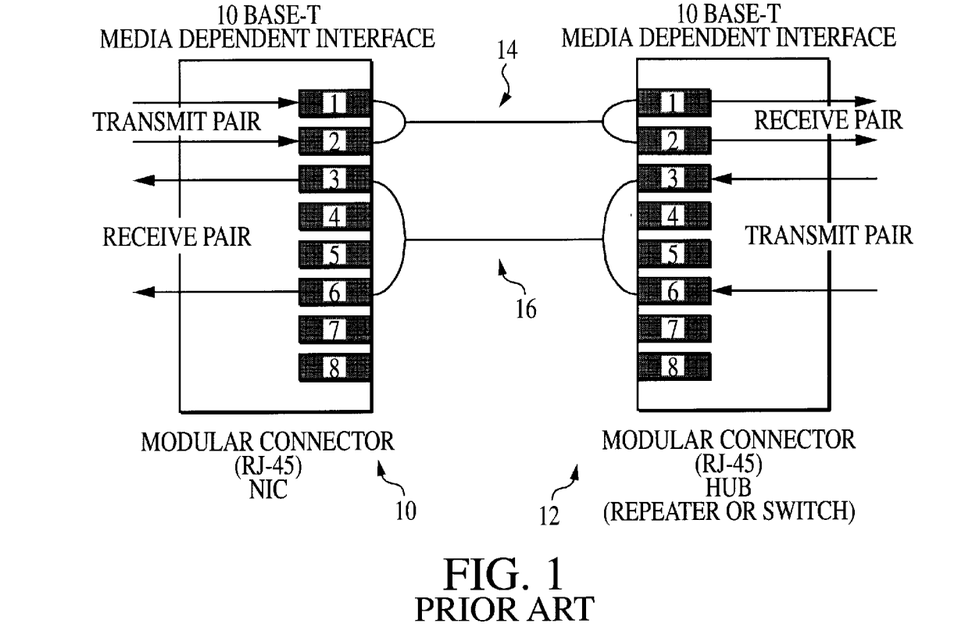
FIG. 1 is a schematic diagram of the prior art and showing a media dependent interface 10BASE-T network interface card connected to a similar hub interface card.

Turning now to the drawings, and particularly FIG. 1, a schematic diagram of a 10BASE-T media dependent interface (MDI) is shown, with a network interface card indicated generally at 10, being shown on the left with a similar hub interface indicated generally at 12 shown on the right, with the transmit pair of connectors of the NIC 10 having pins 1 and 2 connected to pins 1 and 2 of the hub 12 by a twisted pair cable 14. The receive connectors for the NIC 10 are pins 3 and 6 whereas the transmit pair of the hub 12 are pins 3 and 6 and are interconnected with a twisted pair cable 16.

Figure 2:
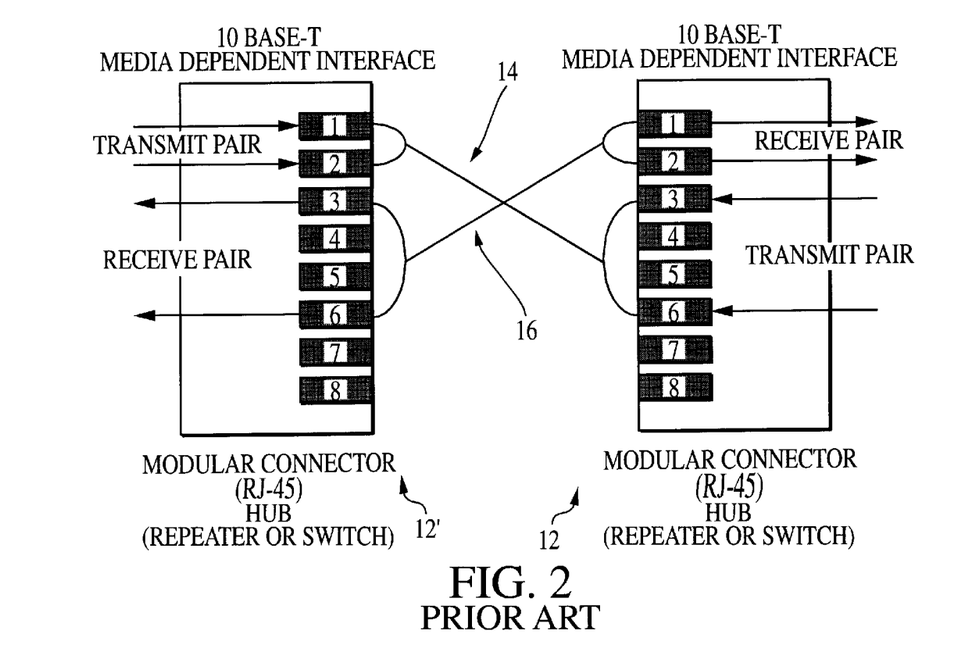
FIG. 2 is a schematic diagram of the prior art and showing two 10BASE-T media dependent interface hubs connected together with a crossover connection to establish and maintain the communication links.
Figure 3:
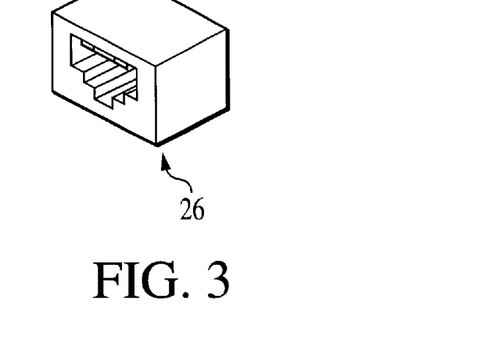
FIG. 3 is a perspective view of a female media dependent interface connector of the type which has pin connectors pursuant to the requirements of section 3 FIGS. 1–4 of IEC603-7, detail specification for connectors.
Figure 4:
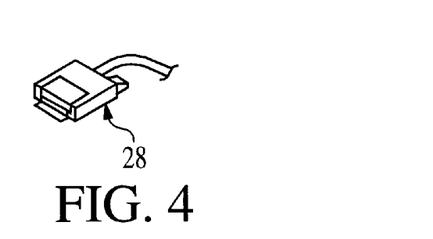
FIG. 4 is a plug connector adapted for use to connect with the female connector shown in FIG. 3.
Figure 5:
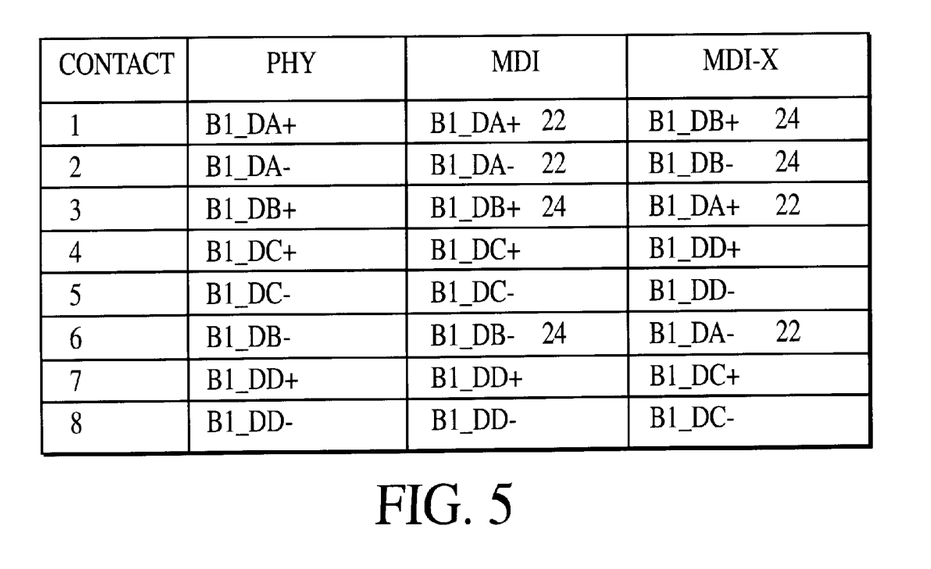
FIG. 5 is a table identifying the assignment of PHY signals to MDI and MDI-X pin identification and configuration.

As shown in FIG. 2, another prior art configuration is illustrated with a repeater or switch or hub 18 being interconnected with a similar repeater, switch or hub 20. In this instance, a crossover connection is necessary so that receive pins 1 and 2 of hub 18 are connected by pair 22 to the transmit pair 3 and 6 of hub 20. Similarly, transmit connectors 3 and 6 are connected to receive connectors 1 and 2 of hub 20 by twisted pair 24. The actual connections are made with MDI 8 pin connectors 26 and pin 28 shown in FIGS. 3 and 4, respectively, and the 8 contacts are connected in the manner set forth in the chart of FIG. 5.

Figure 6:
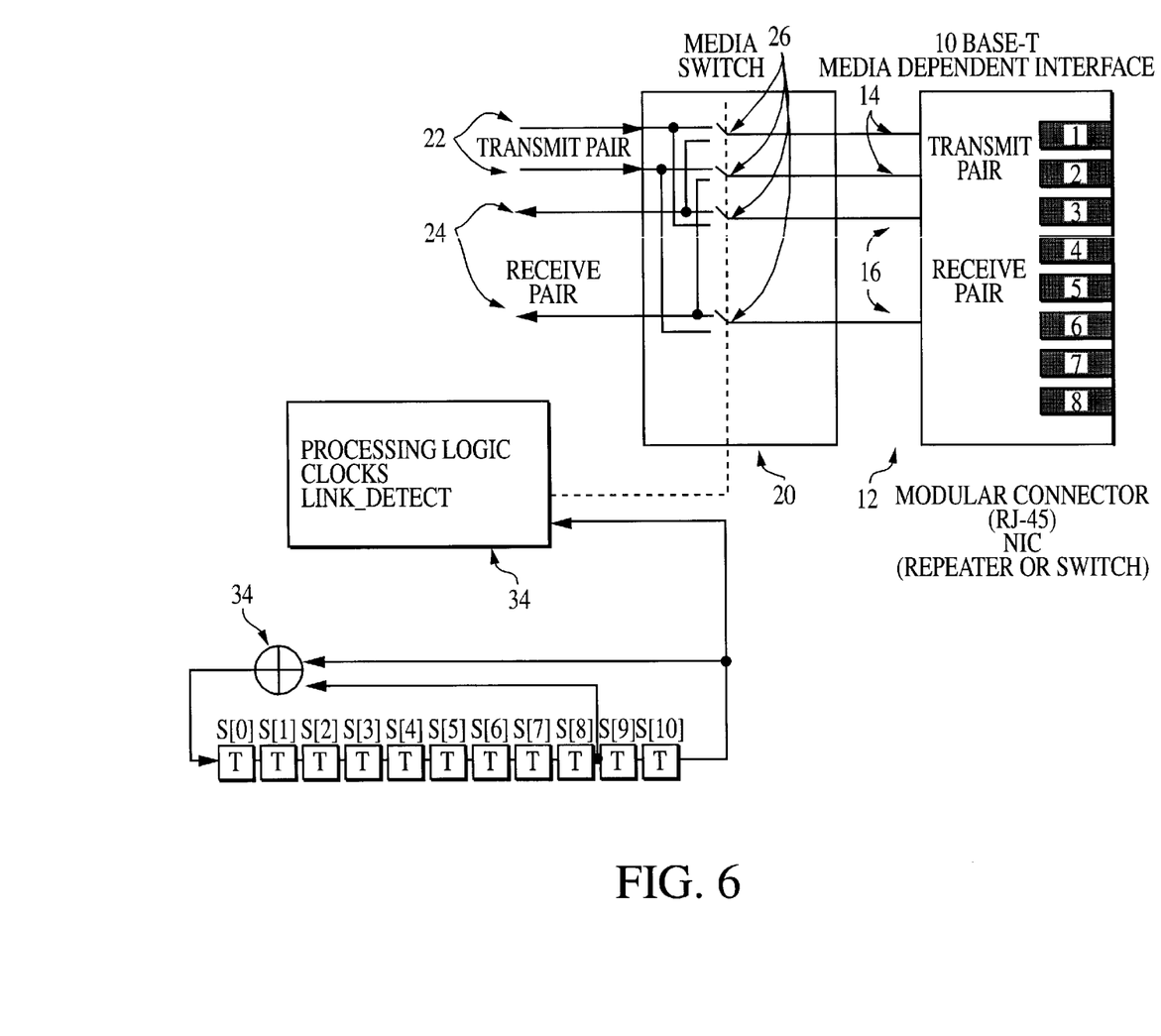
FIG. 6 is an electrical schematic diagram of a network interface card in conjunction with a media switch, a processor and associated circuitry which forms a part of the preferred embodiment of the present invention.

Turning to the apparatus of the present invention, partially shown in FIG. 6, the hub, repeater or switch 12 is shown on the right being connected via twisted pairs 14 and 16 to a media switch 20. The media switch has twisted pairs 22 and 24 that can be connected to another node in the network. The pair 22 has arrows in the rightward direction indicating transmission of data to the right, while the pair 24 shows transmission to the left. The media switch 20 has four sets of contacts 26 which in the position illustrated interconnect the pair 22 with the receive contacts pins 1 and 2, and the pair 24 to the transmit pair pins 3 and 6. As illustrated, the four contacts 26 are adapted to be switched from the position as shown to the lower position responsive to a suitable controlling signal applied to the switch 20. In the lower position, the hub 12 contacts 1 and 2 are connected to the twisted pair 24 and contacts 3 and 6 to the pair 22. It should be apparent that the contacts 26 of the switch 20 will effectively switch the receive and transmit contacts between the pairs 22 and 24.

In accordance with an important aspect of the present invention, the decision to operate the switch 20 and change the contact position, as well as the timing thereof, is controlled by an 11 bit scrambler, indicated generally at 30, which is a linear feedback shift register. The shift register includes an exclusive OR gate 32 which generates a zero (0) if both inputs are equal and a one if they are not. The inputs to the exclusive OR gate are bits 8 and 10 of the shift register. The user can initially load the shift register with a set of values that may be any combination of ones and zeros with the exception that they cannot all be zero. The scrambler 30 executes the polynomial $1+x^9+x^{11}$, and it will repeat its pseudo-random sequence every 2,048 clock cycles.

If there is a similar shift register in another media switch associated with a device that is on the other end of the link, then the possibility of both shift registers having the same value at any one time is 1 in $2^{22}$. While a shorter or longer shift register may be used, the illustrated 11 bit shift register that implements the above polynomial is also used to scramble data in the 100BASE-T specification and is therefore commonly available in the node devices being used. Since they are available, they can obviously be used for the purpose of controlling the switching of the media switch 20. In essence, the shift register 30 has its 10th bit connected to the exclusive OR gate 32 as well as to the control for the switch 20. When the 10th bit is high or a 1, combined with other logic conditions as stated below, the switch is placed in a position opposite that shown in FIG. 6 and corresponding to the table of FIG. 5. Thus, contacts 1 and 2 are connected to pair 24 and contacts 3 and 6 are connected to pair 22.

The apparatus of the present invention includes a signal detector to determine whether any link pulses, or technology signals are present at the receiver. The shift register is preferably clocked with a signal that is derived from a 25 MHZ clock with 100 parts per million accuracy, which is typically used for 100BASE-T and 10BASE-T devices. It should be understood that other clock frequencies may be used in the system with the operation of the network, if the reliability of consistently determining the presence of link pulses or link data is provided. The 25 MHZ clock develops a time unit that can conveniently be termed a time slot which is defined to be preferably 62 milliseconds+−2 milliseconds. This time slot duration is sufficiently long to insure accurate sampling of link pulses which have a maximum spacing of 24 milliseconds. The time slot duration is slightly more than twice the spacing of link pulses and thereby reliably insures that a link pulse will be detected, even though the relative timing of the shift registers of adjacent node devices may be slightly different.

If the present invention is installed in a LAN whereby existing node devices that are not switched are present, the apparatus will properly configure the device so that two way communication will occur in about two time slots. However, if both devices are of the switching type and each includes the shift register 30, then the proper configuration of both devices will occur within 10 time slots. This is shown in the probability chart versus run length in time slots illustrated in FIG. 8.

The present invention includes a processor 34 which is functionally illustrated in FIG. 6 and which is connected to the media switch 20 and the shift register 30. The processor includes a signal detector for detecting signals of predetermined threshold values on the twisted pairs 22 and 24 when connected to the switch 20. The processing means also includes a clock for clocking the shift register 30 as well as an analog free-running timer, identified as an A_timer, for resetting the apparatus including the shift register 30. The shift register 30 reduces the probability of a lock step condition on the basis of two devices which have been initialized at different times.

Figure 8:
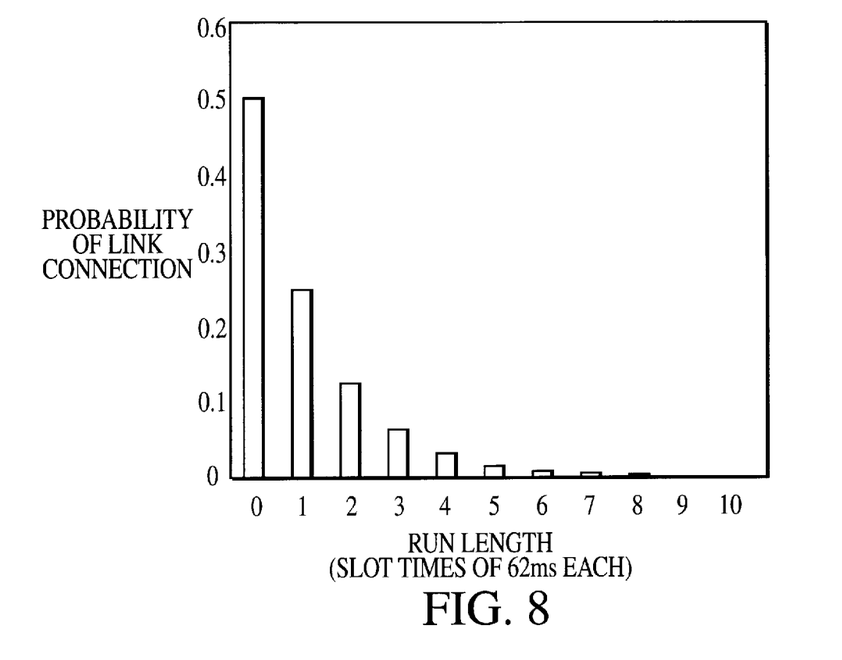

If both devices have a shift register 30, then there is only a 1 in $2^{22}$ chance that both shift registers will be in the exact same state at the same time. This is the only condition in which a lock step situation may exist for two adjacent node devices. Other than this single instance, the two node devices are guaranteed to acquire a communication link within ten slot times as shown in FIG. 8. This is mandated by the fact that two 11 bit shift registers will not go more than 10 cycles in a row with equal values unless they are completely synchronized. Thus, the maximum time required for two node devices to establish a link is approximately 620 milliseconds. While the length of the shift register may be increased to reduce the probability of synchronization between nodes, the maximum link establishment time will be necessarily increased. The length of the shift register may also be reduced, but that would increase the probability that a lock step condition could occur.

The processing means 34 may be a separate microprocessor or other processing means such as a digital state machine or the like; it may be a special chip that incorporates the media switch 20 as well as the shift register. The shift register functionality may be implemented in the processing means rather than an independent circuit such as shown in FIG. 6 and the processing means may be supplied by an interface processor that is part of the node device. Similarly, the node device may include signal detectors which will provide the necessary information to indicate when a communication link has been established or broken, in which case, the physical overhead for implementing the present invention may be virtually free, with the apparatus operating with software routines of the type known to those of ordinary skill in the art given the description of the functionality that is provided herein.

Figure 7:
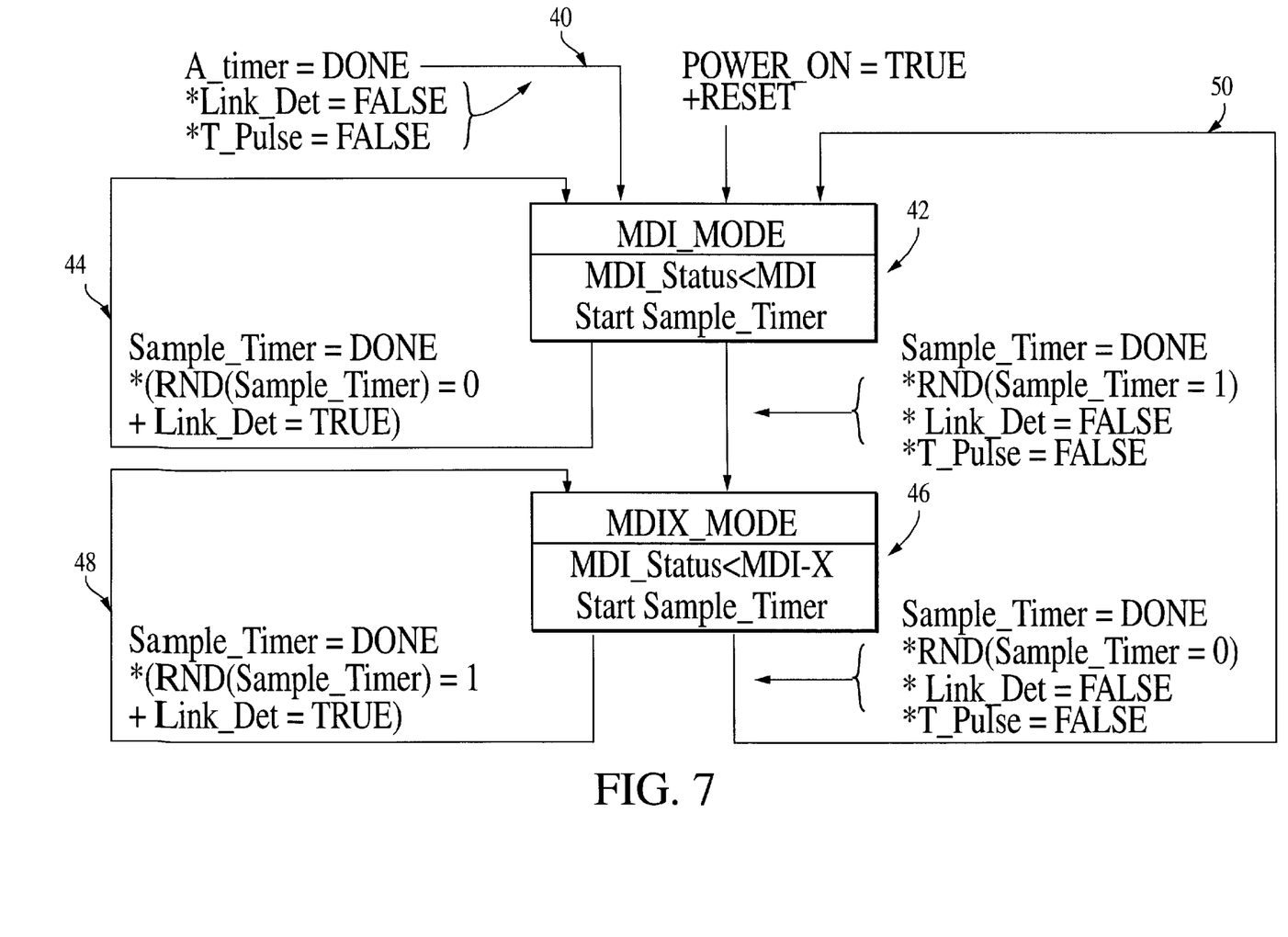
FIG. 7 is a schematic diagram of a state machine which represents the logic of the operation of the apparatus embodying the present invention; and, FIG. 8 is a chart illustrating the probability of not establishing a communication link versus time.

The logic used to operate the present invention is best illustrated in a state machine shown in FIG. 7. The processor 34 includes an A_timer which is preferably an analog timer that has a time base that is provided by a sloppy RC time constant so as to insure that every node device has a random component that is different from all others. This is most easily achieved by the RC time constant and the timer preferably times out approximately every 1.3 seconds, plus or minus 25%. When it times out, it generates a DONE pulse that is applied on line 40 diagrammatically illustrated in the state machine of FIG. 7. When it times out, it sets the media switch 20 in the MDI mode described in FIG. 5 and diagrammatically shown in the block 42 of FIG. 7. In the MDI mode initialization, it starts the sample timer which is the clock that drives the shift register 30 and at the end of each time slot, the sample timer is done and if the 10th bit on the shift register 30 is a zero or the Link_Detect signal is true, then the apparatus is maintained in the MDI mode as diagrammatically shown by line 44.

If the Link_Detect signal is true, that is an indication that communication has been established. More specifically, the Link_Detect signal can be true based upon a number of criteria. One is that a link pulse is received, another is if MLT3 data is received, which is basically the signaling for 100BASE-T technology. Another is if 10BASE-T signaling is received. Another is if a fast link pulse, which is a series of link pulses that are spaced closely together is received. All of these types of signals can establish a true Link_Detect signal if the energies on the receiver exceed a certain threshold, which is preferably a voltage in excess of 500 millivolts for a duration of more than 50 nanoseconds.

If the apparatus is in the MDI mode and at the end of the sample timer time slot, the tenth bit of the shift register 30 is a one and the Link_Detect signal is false and a T-pulse is also false, the apparatus will switch the media switch 20 into the MDIX mode which is shown by block 46. That will cause the sample timer to be started, which when done, will result in staying in the MDIX mode if the tenth bit of the shift register 30 is a one or the Link_Detect signal is also true. If the tenth bit of the shift register 30 is a zero at the end of the sample timer time slot and Link_Detect is false and the T-pulse signal is also false, the switch 20 will switch back to the MDI mode as shown by line 50. In all situations, when the Link_Detect signal is true, indicating that a communication link has been established, the logic then ignores the sample timer and the value of the tenth bit of the shift register 30 until the Link_Detect signal goes false.

With regard to the T-pulse, it is a pulse that is generated when something is being transmitted onto the wire pair. It is generated to preclude switching between MDI and MDIX modes at that particular point in time. The reason for doing so is that if a switch between modes is done in the middle of a pulse transmission, it is possible that a reflection of the pulse being transmitted could then come into the receiver because of the switch occurring in the middle of transmission. It could appear to the receiver that it detected something when in fact it was merely a reflection of the pulse that was transmitted. So the T-pulse is used to eliminate the probability of that pulse coming back and interfering with the receiver. The MDI mode is the mode that the apparatus initially establishes and is the mode that a reset will drive it to.

During operation, if someone were to unplug one of the pairs, the Link_Detect will go false. At that point, either A_timer will have reset itself, which will cause the apparatus to drop into the MDI mode and start the sequence over again, or Sample_Timer will expire and depending on the value of the 10th bit of shift register 30 the switch will either go back to MDI mode or move to MDIX mode. Since the A_timer is a free running timer, it outputs a pulse at the end of its time period of approximately 1.3 seconds. If A_timer is DONE, the Link_Detect signal is false, and T_pulse is false, the conditions for transition 40 of FIG. 7 are true and the state machine will go to the MDI_MODE state. When the Link_Detect signal is false, the sample timer would very likely be done within approximately 62 milliseconds and then depending upon the value of the tenth bit of the shift register 30, would either switch to the other mode or not.

From the foregoing, it should be appreciated that an extremely robust, reliable and effective apparatus has been described which automatically configures LAN devices so that bi-directional communication is enabled, with the apparatus being inexpensive to implement and maintain. The apparatus automatically determines and sets the interface configuration of end node media dependent interfaces (MDI) or interfaces for repeaters, switches and hubs which have a MDIX configuration. The apparatus is easily implemented and is interoperable with nearly all existing products.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for automatically configuring media connectors of a node interface device in a local area network of the type which has at least two pairs of conductors between interconnected interface devices, with data being transmitted in one pair, including link data, being in the opposite direction relative to data being transmitted in the other pair, each node interface device having at least a first pair of connectors which are adapted to transmit data and at least a second pair of connectors adapted to receive data, the connectors being adapted to be selectively connected to the at least two pairs of conductors, said apparatus comprising:

switch means responsive to a switching signal and an inhibiting signal and adapted to selectively connect a first pair of connectors to a first pair of conductors and a second pair of connectors to a second pair of conductors when said switch means is in a first position, and selectively connect said first pair of connectors to a second pair of conductors and said second pair of connectors to said first pair of conductors when said switch means is in a second position;

means for generating a controlling signal for selectively controlling said switch means between said first and second positions, said controlling signal having one of first and second values during each time period, said controlling signal values changing in a pseudo-random manner; and, means for detecting link data in one of said pairs of connectors and generating an inhibiting signal in response to link data being detected, said inhibiting signal being applied to said switch means to thereafter indefinitely prevent switching thereof.

2. Apparatus as defined in claim 1 wherein each said time period is constant and predetermined.

3. Apparatus as defined in claim 2 wherein said time period is within the range of about 60 milliseconds and about 64 milliseconds.

4. Apparatus as defined in claim 3 wherein said controlling signal generating means is a linear feedback shift register.

5. Apparatus as defined in claim 4 wherein said controlling signal generating means is a linear feedback shift register adapted to execute the polynomial expression $1+x^9+x^{11}$.

6. Apparatus as defined in claim 5 wherein said linear feedback shift register is an 11 bit linear feedback shift register.

7. Apparatus as defined in claim 3 wherein said value is a digital 1 or 0.

8. Apparatus as defined in claim 3 wherein said controlling signal generating means includes a means for producing a sample clock signal for generating a time base corresponding to said time periods.

9. Apparatus as defined in claim 1 further including an essentially random time generator for generating a reset signal for resetting said controlling signal generating means after a second time period having a generally constant duration, said second time period being substantially greater than said controlling signal generating time period.

10. Apparatus as defined in claim 9 wherein said random time generator comprises an analog electrical circuit that generates said reset signal.

11. Apparatus as defined in claim 1 wherein said interface devices comprise one of a Media Dependent Interface (MDI) Network Interface Card (NIC) used as an end node device and a Media Dependent Interface Crossover (MDIX) used as a part of a repeater or switch.

12. Apparatus associated with at least one node interface device for automatically configuring media connectors of the node interface device directly connected to another node interface device in a network of the type which has at least first and second pairs of conductors between directly connected interface devices and wherein data, including link data, is transmitted in the first pair in a first direction and in a second direction in the second pair, each node interface device having at least a first pair of connectors which are adapted to transmit data and at least a second pair of connectors adapted to receive data, the apparatus being adapted to selectively connect the two pairs of connectors to the two pairs of conductors to alternate the connection of the first and second pairs of connectors with the two pairs of conductors, said apparatus comprising:

switch means adapted to selectively alternate the connection of the first and second pairs of connectors with the two pairs of conductors when operated responsive to a controlling signal having a first predetermined value being applied thereto;

means for successively generating a controlling signal having a value that changes between said first predetermined value and a second predetermined value for operating said switch means; said controlling signal value changing in a pseudo-random manner; and, means for detecting link data in one of said pairs of connectors and generating a signal for inhibiting the application of said controlling signal having said first predetermined value to said switch means in response to link data being detected.

13. Apparatus as defined in claim 12 wherein said node interface devices comprise one of an end node device and an intermediate node device.

14. Apparatus as defined in claim 13 wherein an intermediate node device is a repeater or switch.

15. Apparatus as defined in claim 12 wherein said controlling signal generating means is a linear feedback shift register.

16. Apparatus as defined in claim 15 wherein said controlling signal generating means is a linear feedback shift register adapted to execute the polynomial expression $1+x^9+x^{11}$.

17. Apparatus associated with at least one node interface device for automatically configuring media connectors of the node interface device directly connected to another node interface device in a network of the type which has at least two pairs of conductors between directly connected interface devices, so that data, including link data, that is transmitted from a first node interface device is capable of being received in the directly connected second node interface device, and visa versa, each node interface device having at least a first pair of connectors which are adapted to transmit data and at least a second pair of connectors adapted to receive data, the apparatus being adapted to selectively connect the two pairs of connectors to the two pairs of conductors to alternate the first and second pairs of connectors with the two pairs of conductors to achieve the configuration that results in bi-directional data communication between the first and second node interface devices, said apparatus comprising:

switch means adapted to selectively alternate the connection of the first and second pairs of connectors with the two pairs of conductors when operated responsive to a controlling signal having a first predetermined value being applied thereto;

means for successively generating a controlling signal having a value that changes between said first predetermined value and a second predetermined value for operating said switch means, and including a clock generator for establishing a clock period during which one of said values is generated, said controlling signal value changing in a pseudo-random manner that results in the maintenance of one of said values during at least two successive clock periods; and, means for detecting link data in one of said pairs of connectors and generating a signal for inhibiting the application of said controlling signal having said first predetermined value to said switch means in response to link data being detected.

* * * * *